United States Patent
Tamai et al.

(10) Patent No.: US 7,746,805 B2
(45) Date of Patent: Jun. 29, 2010

(54) COMMUNICATION NETWORK USING SYNCHRONOUS CODE DIVISION MULTIPLEXING METHOD

(75) Inventors: Hideaki Tamai, Kanagawa (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 777 days.

(21) Appl. No.: 11/606,150

(22) Filed: Nov. 30, 2006

(65) Prior Publication Data

US 2007/0127554 A1 Jun. 7, 2007

(30) Foreign Application Priority Data

Dec. 2, 2005 (JP) .............................. 2005-349131

(51) Int. Cl.
G01R 31/08 (2006.01)
H04J 13/00 (2006.01)
H04J 1/00 (2006.01)
H04J 3/06 (2006.01)
H04J 4/00 (2006.01)

(52) U.S. Cl. ....................... 370/252; 370/479; 370/489; 370/516; 398/77

(58) Field of Classification Search ................ 370/342, 370/432, 441, 479, 489, 516, 503; 398/77, 398/66, 78, 76, 75

See application file for complete search history.

(56) References Cited

U.S. PATENT DOCUMENTS 4,703,474 A * 10/1987 Foschini et al. ............. 370/441
5,101,417 A * 3/1992 Richley et al. .............. 375/147
5,579,321 A * 11/1996 Van Grinsven et al. ...... 370/442
6,665,308 B1 * 12/2003 Rakib et al. ................. 370/441
6,996,077 B1 * 2/2006 Suenaga et al. ............. 370/320
7,324,753 B2 * 1/2008 Kashima et al. ............... 398/77
7,564,774 B2 * 7/2009 Kashima et al. ............. 370/203

OTHER PUBLICATIONS

"Ethernet PON System", H. Ohnishi et al., Fujikura Giho No. 102, pp. 18-21, Apr. 2002.

* cited by examiner

Primary Examiner—Nittaya Juntima
(74) Attorney, Agent, or Firm—Rabin & Berdo, P.C.

(57) ABSTRACT

In a communication network which performs transmission from a plurality of first communication devices to a single second communication device using a synchronous code division multiplexing technique, the phases of signals transmitted from the first communication devices are synchronized easily. The first communication devices control the transmission phase of spread modulated signals using phase control information received from the second communication device. A repeater generates a code division multiplexed signal by superposing the spread modulated signals transmitted respectively from the first transmission devices. The second transmission device demultiplexes the code division multiplexed signal received from the repeater, determines the optimum phase of the demultiplexed signals, and transmits the determined optimum phase to the first transmission devices as the phase control information.

19 Claims, 10 Drawing Sheets

COMMUNICATION NETWORK USING SYNCHRONOUS CODE DIVISION MULTIPLEXING METHOD

BACKGROUND OF THE INVENTION

1. Field of the Invention

The present invention relates to a communication network which performs communication from a plurality of transceivers to a single receiver using synchronous code division multiplexing, and more particularly to a technique for establishing synchronism in this communication. The present invention may be applied to a PON (Passive Optical Network) type optical communication network, for example.

2. Description of Related Art

A network referred to as FTTx is known as an example of an optical communication network. FTTx is a communication network for connecting an accommodating apparatus to a subscriber building (a house, an office, or the like) using optical fiber. FTTH (Fiber To The Home) is known as an example of FTTx. FTTx is used as an access system for connecting a terminal computer of the subscriber to the Internet, for example.

A PON (Passive Optical Network) is known as an example of a technique for realizing FTTx. In a PON, a plurality of communication terminals (ONUs; Optical Network Units) are connected to a single optical communication path which is connected to an accommodating apparatus (OLT; Optical Line Terminal) via an optical coupler. A PON realizes low-cost broadband communication by sharing the single optical communication path among the plurality of ONUs.

On a shared communication path, an uplink direction (i.e. from the optical coupler to the OLT) communication channel and a downlink direction (i.e. from the OLT to the optical coupler) communication channel are divided by Wavelength Division Multiplexing (WDM). The downlink direction communication channel and uplink direction communication channel are respectively shared among the plurality of ONUs using a technique such as Time Division Multiplexing (TDM) or Code Division Multiplexing (CDM).

An STM (Synchronous Transfer Mode)-PON, an ATM (Asynchronous Transfer Mode)-PON, and an Ethernet (registered trademark)-PON are known as examples of PONs using TDM. In an STM-PON, the communication time of each ONU is allocated in a fixed manner. In an ATM-PON, the communication time allocated to each ONU is varied dynamically in accordance with the amount of communication data. An Ethernet-PON uses a LAN (Local Area Network) switching technique as a technique for sharing the communication path. An Ethernet-PON is disclosed in "Ethernet PON System", H. Ohnishi et al, Fujikura Giho No. 102, pages 18 to 21, April 2002, for example.

Synchronous CDM and asynchronous CDM are known as types of CDM. A synchronous CDM-PON multiplexes synchronized communication data. On the other hand, an asynchronous CDM-PON multiplexes communication data that have not been synchronized. Synchronous CDM is disadvantaged in that processing is required to synchronize the communication data but advantaged in that the effects of interference are small. Therefore, a synchronous CDM-PON is capable of securing an extremely high transmission efficiency.

Downlink direction synchronous CDM is realized by simple control. The OLT synchronizes, multiplexes, and transmits communication frames storing header information for identifying a destination. Each ONU determines the destination using the header information in the received communication frames, and scraps communication frames addressed to other ONUs.

In contrast, uplink direction synchronous CDM requires complicated control. The reason for this is that the transmission phase of the communication frames must be adjusted among the ONUs. Typically, the optical distances of the optical communication paths connecting the respective ONUs to the optical coupler are different to each other. Accordingly, the transmission times between the respective ONUs and the optical coupler also differ from each other. Therefore, phase adjustment of the communication frames transmitted respectively by each ONU is extremely complicated.

SUMMARY OF THE INVENTION

An object of the present invention is to provide a technique for easily synchronizing the phase of signals transmitted from a plurality of first communication devices in a communication network for performing transmission from the first communication devices to a single second communication device using a synchronous code division multiplexing technique.

To achieve this object, a communication network according to the present invention comprises: a plurality of first communication devices, each of which comprises a first transceiver for transmitting a spread modulated signal, a first receiver for receiving phase control information, and a first controller for controlling a phase at which the first transceiver transmits the spread modulated signal, using the phase control information; a repeater for generating a code division multiplexed signal by superposing spread modulated signals transmitted respectively by the first communication devices; and a second communication device comprising a second receiver for receiving and demultiplexing the code division multiplexed signal, a second controller for determining an optimum phase of the spread modulated signal for each of the first communication devices using the demultiplexed signal, and a second transceiver for transmitting the optimum phase to the first receiver as the phase control information.

BRIEF DESCRIPTION OF THE DRAWINGS

Other objects and advantages of the present invention will be described with reference to the following attached drawings, in which.

DESCRIPTION OF THE PREFERRED EMBODIMENTS

Embodiments of the present invention will be described below using the drawings. In the drawings, the size, shape, and positional relationships of each constitution component are illustrated schematically to an extent which facilitates understanding of the present invention. Furthermore, the numerical conditions described below are merely examples.

First Embodiment

Figure 1:
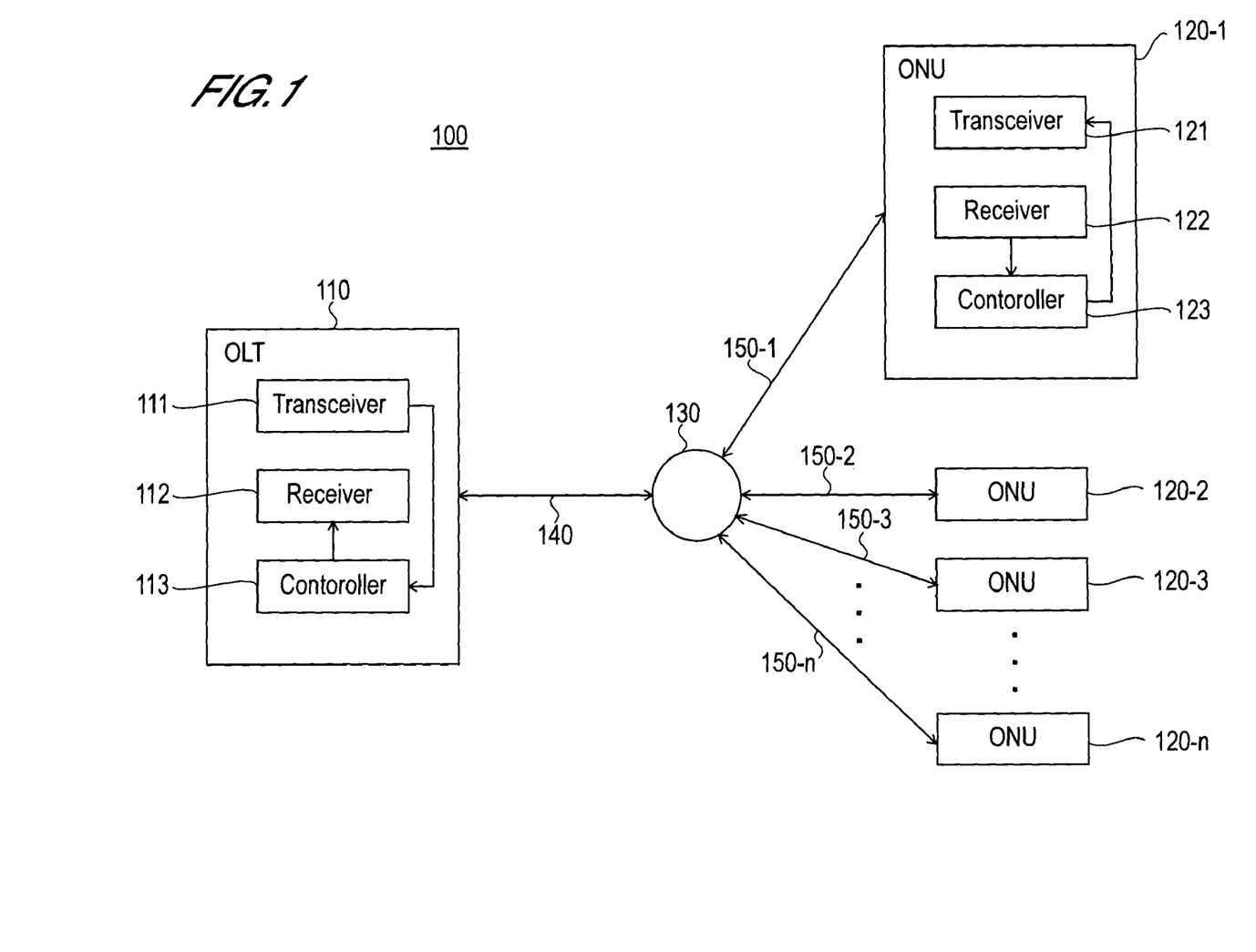
FIG. 1 is a schematic diagram showing the overall constitution of a communication network according to a first embodiment.

FIG. 1 is a schematic diagram showing the overall constitution of a synchronous CDM-PON 100 according to this embodiment. As shown in FIG. 1, the synchronous CDM-PON 100 comprises a single OLT 110, a plurality of ONUs 120-1 to 120-n, a single optical coupler 130, a single shared optical communication path 140, and a plurality of optical communication paths 150-1 to 150-n that are not shared.

The OLT 110 is provided and managed by a telephone company, for example. The OLT 110 is connected to an external network such as the Internet or another global network, for example. The OLT 110 accommodates the ONUs 120-1 to 120-n using the optical coupler 130 and the optical communication paths 140, 150-1 to 150-n. The OLT 110 comprises a transceiver 111, a receiver 112, and a controller 113. The transceiver 111 creates a synchronous code division multiplexed communication frame from IP (Internet Protocol) packets or the like received from the external network, and transmits the created communication frame to the ONUs 120-1 to 120-n. If necessary, timing information to be described below is stored in the communication frame. The receiver 112 converts a multiplexed communication frame received from the ONUs 120-1 to 120-n into an IP packet or the like, and transmits the converted communication frame to the external network. The controller 113 generates timing information using a synchronization signal received from the receiver 112, and transmits the generated timing information to the transceiver 111. A method of generating the timing information will be described below.

The ONUs 120-1 to 120-n are communication terminals used by subscribers. The ONUs 120-1 to 120-n are connected to an information terminal such as a personal computer, for example. As shown in FIG. 1, the ONU 120-1 comprises a transceiver 121, a receiver 122, and a controller 123. The transceiver 121 converts communication data received from the personal computer or the like into spread spectrum modulated communication frames, and transmits the communication frames to the OLT 110. The transceiver 121 generates communication frames using a carrier having a different frequency from that of the transceiver 111 of the OLT 110. Therefore, wavelength division multiplexing can be performed between uplink communication and downlink communication. The receiver 122 demultiplexes a communication frame received from the OLT 110, transmits the data in a communication frame addressed to the ONU 120-1 to the information terminal, for example the personal computer or the like, and scraps the other communication frames. The receiver 122 extracts timing information from the communication frame addressed to the ONU 120-1, and transmits the extracted timing information to the controller 123. The controller 123 controls the timing at which the transceiver 121 transmits the communication frame on the basis of the timing information. A timing control method will be described below. The ONUs 120-2 to 120-n are constituted similarly to the ONU 120-1.

The optical coupler 130 distributes a multiplexed communication frame input from the optical communication path 140, and outputs the distributed communication frames into the optical communication paths 150-1 to 150-n. In addition, the optical coupler 130 performs code division multiplexing by superposing modulated communication frames input from the optical communication paths 150-1 to 150-n. As noted above, the transmission timing of the modulated communication frames is controlled by the controller 123, and hence the multiplexing performed by the optical coupler is synchronous code division multiplexing. The multiplexed communication frame is output to the optical communication path 140.

The optical communication path 140 connects the OLT 110 and optical coupler 130 communicably. The optical communication path 140 is shared by the ONUs 120-1 to 120-n. The optical communication path 140 is typically constructed using a single optical cable.

The optical communication paths 150-1 to 150-n connect the optical coupler 130 to the ONUs 120-1 to 120-n communicably. The optical communication paths 150-1 to 150-n are each connected to a single corresponding ONU. The optical communication paths 150-1 to 150-n are each constructed using a single optical cable.

Figure 2:
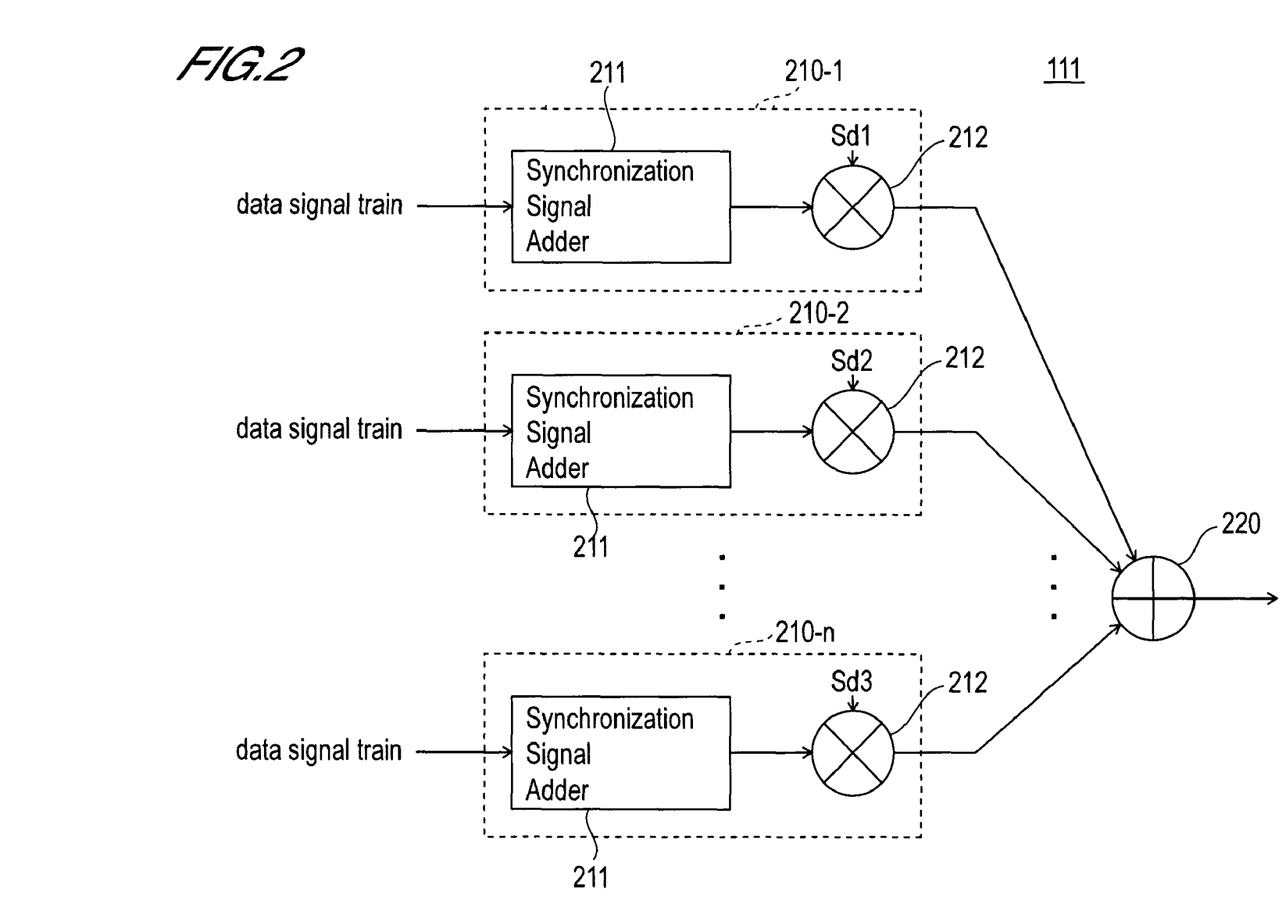
FIG. 2 is a block diagram showing the constitution of a transceiver provided in the interior of an OLT shown in FIG. 1.

FIG. 2 is a block diagram showing the constitution of the transceiver 111 provided in the interior of the OLT 110.

As shown in FIG. 2, the transceiver 111 comprises a plurality of transmission circuits 210-1 to 210-n and a single adder 220.

The transmission circuits 210-1 to 210-n convert IP packets received from the Internet or the like into data signal using a conversion circuit not shown in the drawing. A synchronization signal adder 211 generates a communication frame by adding a synchronization signal to the data signal train. The structure of the synchronization signal will be described below using FIG. 6. A calculator 212 performs spread spectrum modulation of the communication frame using one of spread codes Sd1 to Sdn. The values of the spread codes Sd1 to Sdn differ from each other. In other words, the transmission circuits 210-1 to 210-n use spread codes having different values. There are no limitations on the type of spread code, but an orthogonal gold code, for example, which has excellent autocorrelation and cross-correlation characteristics, may be used.

The adder 220 receives the modulated communication frames from the transmission circuits 210-1 to 210-n and superposes the frames. Thus the communication frames are code division multiplexed. By adjusting the timing at which each transmission circuit 210-1 to 210-n outputs a modulated communication frame to the adder 220, synchronous code division multiplexing is realized.

Figure 3:
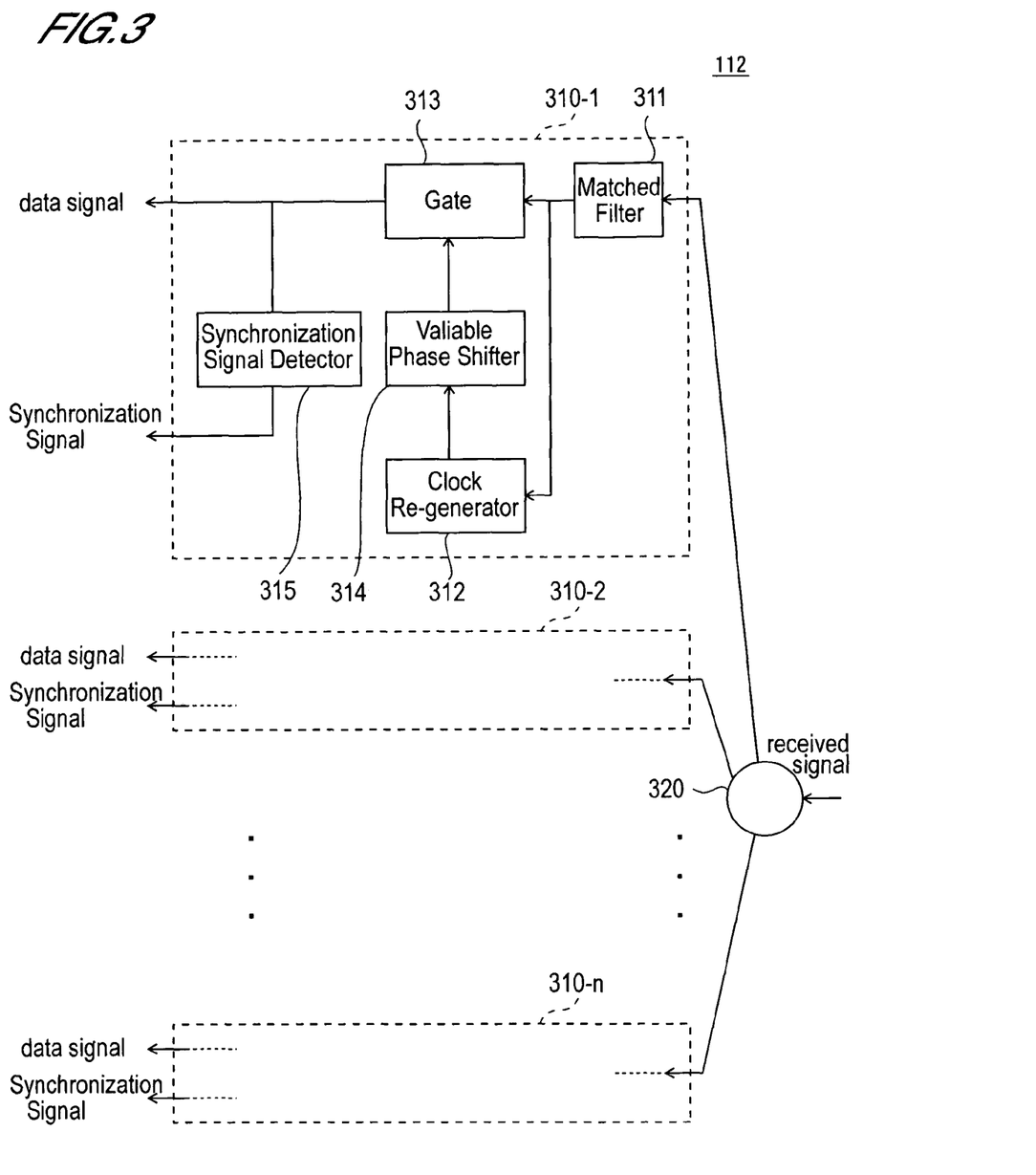
FIG. 3 is a block diagram showing the constitution of a receiver provided in the interior of the OLT shown in FIG. 1.

FIG. 3 is a block diagram showing the constitution of the receiver 112 provided in the interior of the OLT 110.

As shown in FIG. 3, the receiver 112 comprises a plurality of reception circuits 310-1 to 310-n and a distributor 320. Each receiver 310-1 to 310-n comprises a matched filter 311, a clock regenerator 312, a gate 313, a variable phase shifter 314, and a synchronization signal detector 315.

The matched filter 311 performs calculation processing using one of spread codes Su1 to Sun, and thereby demultiplexes desired communication frames from the received multiplexed communication frames. For example, when the multiplexed communication frames are demultiplexed using the spread code Su1, the multiplexed communication frames are multiplied by the spread signal Su1.

The clock regenerator 312 regenerates sampling clock using fixed signal 611 (see FIG. 6, to be described below) of the communication frame output from the matched filter 311. Sampling clock regeneration may be performed using a Phase Locked Loop (PLL) circuit, for example.

The gate 313 latches the communication frames output from the matched filter 311, and outputs the communication frames in accordance with timing signal input from the variable phase shifter 314.

The variable phase shifter 314 controls the timings at which the communication frames are output from the gate 313 on the basis of the sampling clock input from the clock regenerator 312. As a result, the phases of the received communication frames are controlled.

The synchronization signal detector 315 detects and outputs synchronization signal in the communication frames output by the gate 313.

The distributor 320 distributes the received signal to the reception circuits 310-1 to 310-n.

Figure 4:
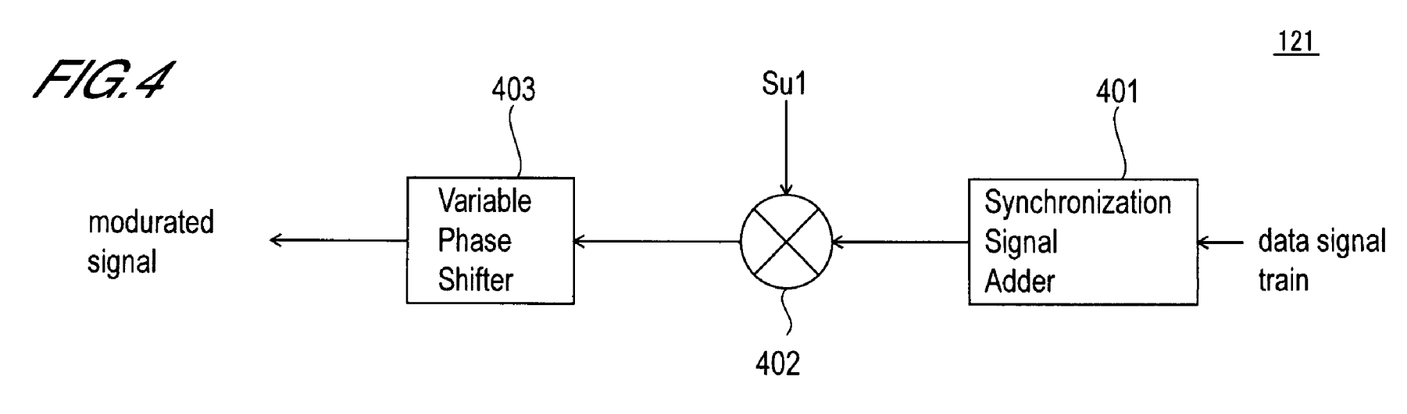
FIG. 4 is a block diagram showing the constitution of a transceiver provided in the interior of an ONU shown in FIG. 1.

FIG. 4 is a block diagram showing the constitution of the transceiver 121 provided in the interior of the ONUs 120-1 to 120-n.

The transceiver 121 of FIG. 4 receives the user data from the personal computer or the like, converts the user data to the data signal train using a conversion circuit which is not shown in the drawing, and transmits the data signal train to a synchronization signal adder 401.

The synchronization signal adder 401 generates a communication frames by adding the synchronization signals to the data signal train. The synchronization signal will be described below.

A calculator 402 performs spread spectrum modulation of the communication frame by performing calculation processing using a spread code. The spread code values Su1 to Sun differ in each ONU 120-1 to 120-n. FIG. 4 is an example in which the spread code values Su1 is adopted. In this embodiment, there are no limitations on the type of spread code, but an orthogonal gold code, for example, which has excellent autocorrelation and cross-correlation characteristics, may be used.

A variable phase shifter 403 adjusts the phases of the modulated communication frames input from the calculator 402 on the basis of the timing control performed by the controller 123 (see FIG. 1). By means of this adjustment, the timing at which the communication frames output from the respective ONUs 120-1 to 120-n reach the optical coupler 130 can become simultaneously.

Figure 5:
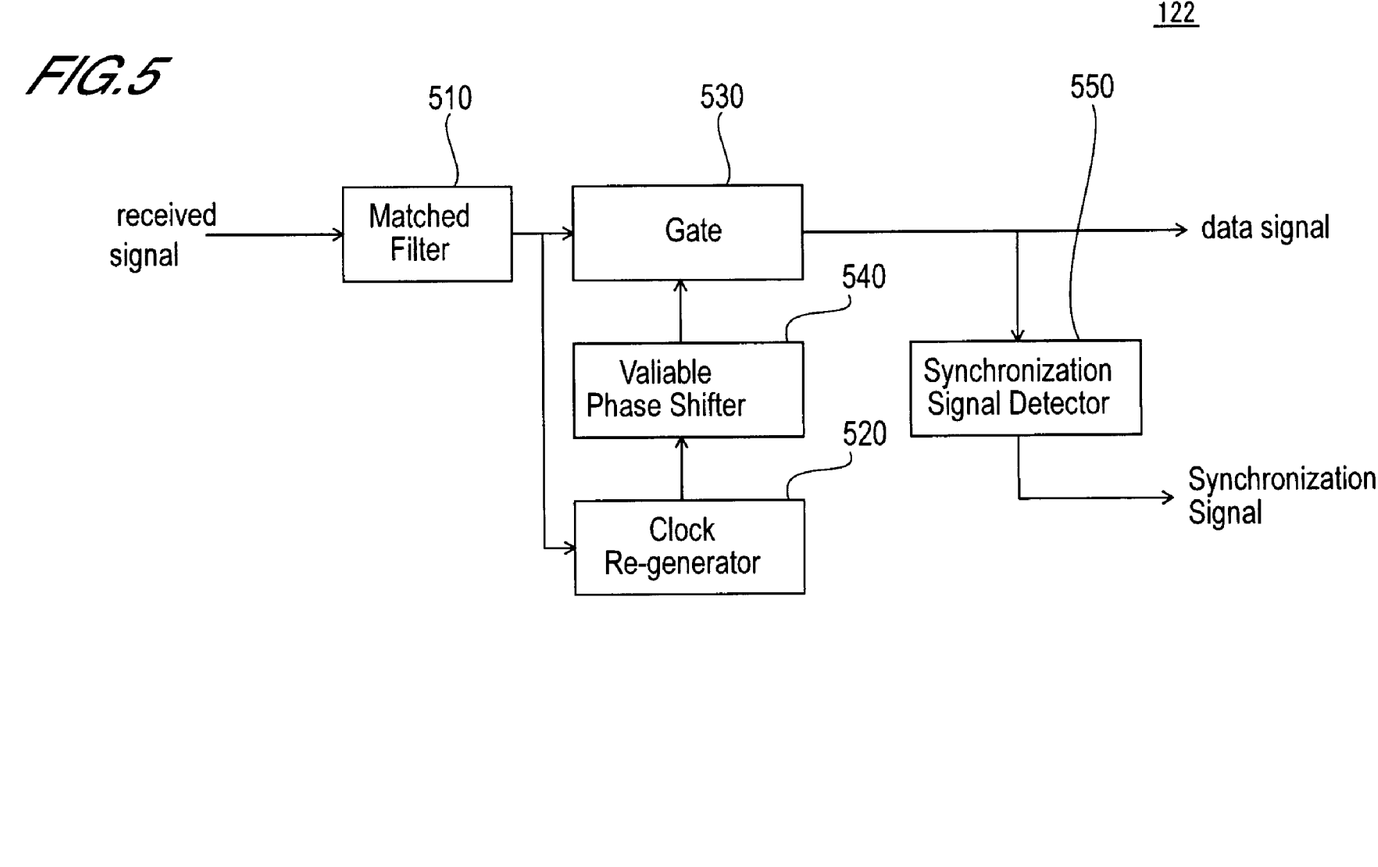
FIG. 5 is a block diagram showing the constitution of a receiver provided in the interior of the ONU shown in FIG. 1.

FIG. 5 is a block diagram showing the constitution of the receiver 122 provided in the interior of the ONUs 120-1 to 120-n.

As shown in FIG. 5, the receiver 122 comprises a matched filter 510, a clock regenerator 520, a gate 530, a variable phase shifter 540, and a synchronization signal detector 550.

The matched filter 510 demultiplexes communication frames addressed to itself from received multiplexed communication frames by performing calculation processing using a spread code. The matched filter 510 uses a corresponding spread code from among the spread codes Sd1 to Sdn used by the transmission circuits 210-1 to 210-n provided in the OLT 110 (see FIG. 2). For example, the matched filter 510 in the ONU 120-1 uses the same spread code Sd1 as that of the transmission circuit 210-1.

The clock regenerator 520 regenerates sampling clock using the communication frames output from the matched filter 510. Sampling clock regeneration may be performed using a Phase Locked Loop (PLL) circuit, for example.

The gate 530 latches the communication frames output from the matched filter 510, and outputs the communication frames in accordance with timing signal input from the variable phase shifter 540.

The variable phase shifter 540 controls the timings at which the communication frames are output from the gate 530 on the basis of the sampling clock input from the clock regenerator 520. As a result, the phases of the communication frames are controlled.

The synchronization signal detector 550 detects and outputs the synchronization signal in the communication frame output by the gate 530.

Figure 6:
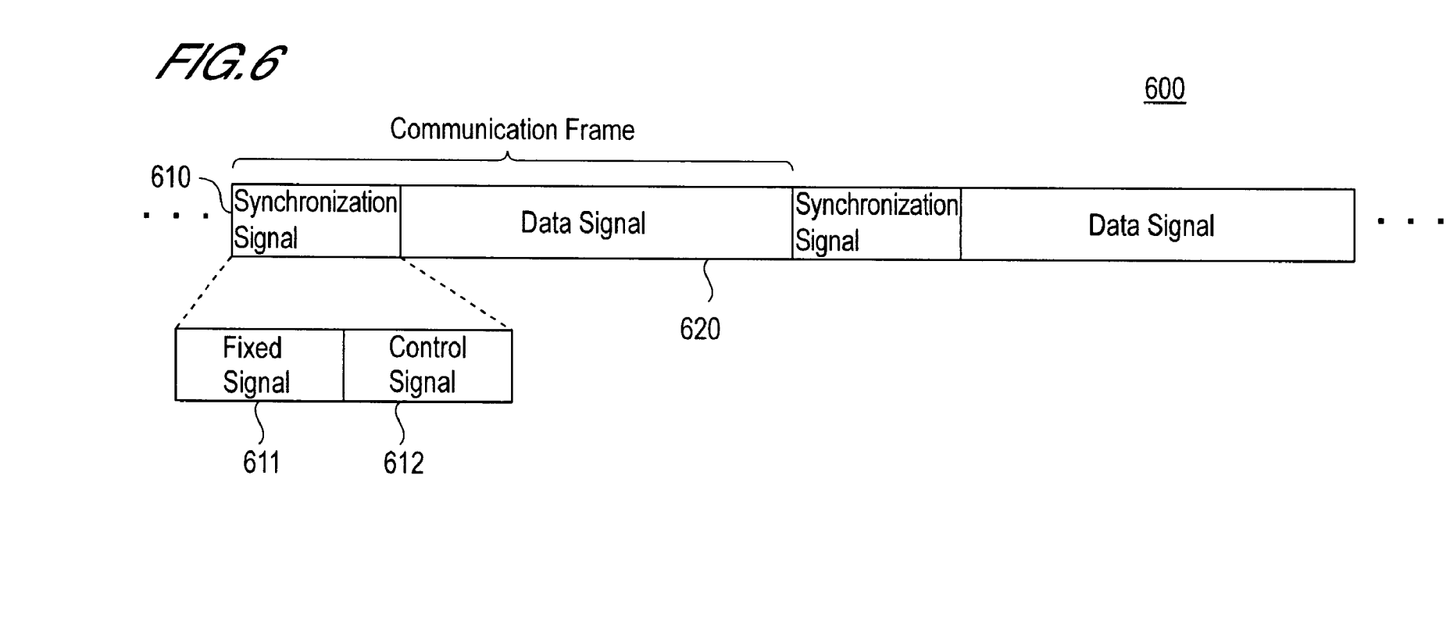
FIG. 6 is a schematic diagram showing the structure of a communication frame used in the first embodiment.

FIG. 6 is a schematic diagram showing the structure of the communication frame used in the synchronous CDM-PON 100.

As shown in FIG. 6, a communication frame 600 according to this embodiment includes a synchronization signal field 610 and a data signal field 620.

The synchronization signal field 610 stores a fixed signal 611 and a control signal 612. The fixed signal 611 is constituted by a bit string having a predetermined pattern (for example, a repeated sequence of "1" and "0"). The control signal 612 is used by the OLT 110 to control the ONUs 120-1 to 120-n. Data enabling the OLT 110 to control an operation of the ONUs 120-1 to 120-n are stored as the control signal 612 in the communication frames 600 that are transmitted from the OLT 110 to the ONUs 120-1 to 120-n. As will be described below, in this embodiment data for modifying a phase shift time Δt of the variable phase shifter 540 (see FIG. 5) provided in the receiver 121 of the ONUs 120-1 to 120-n are stored in the communication frame 600 as the control signal 612. On the other hand, a response signal to a control signal received from the OLT 110 is stored as the control signal 612 in the communication frames 600 that are transmitted to the OLT 110 from the ONUs 120-1 to 120-n.

The data signal field 620 stores user data.

Next, the principles of spread modulation will be described using FIG. 7.

Spread modulation is processing for converting each bit of a digital signal into a signal pattern having shorter bit intervals using a constant known as a spread code. The spread code is constituted by a predetermined bit string which is unique to each communication channel.

Figure 7:
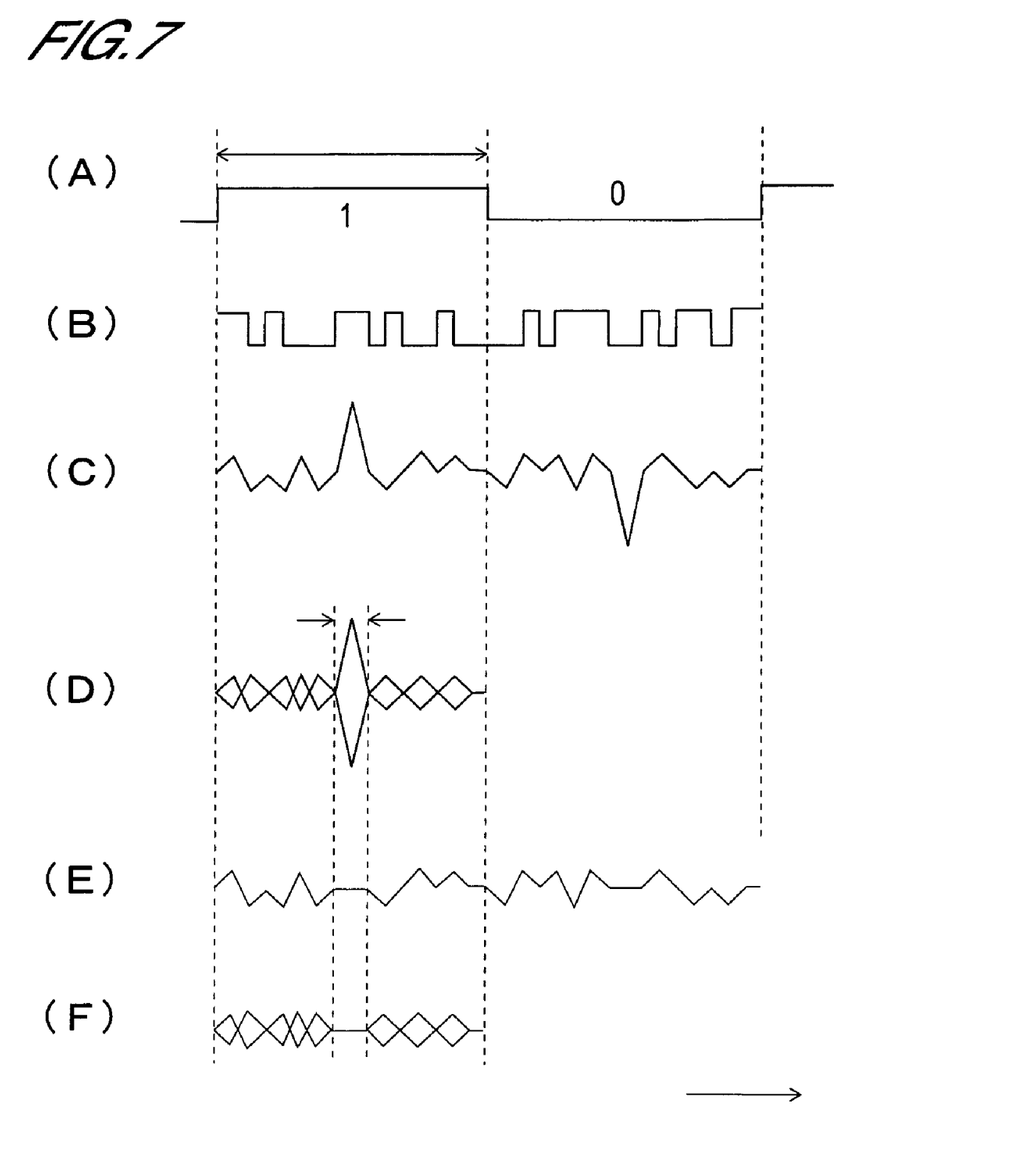
FIG. 7 is a waveform diagram illustrating an operation of the communication network according to the first embodiment.

In FIG. 7, (A) is a schematic diagram showing the pattern of a digital signal that has not been spread modulated, and (B) is a schematic diagram showing the pattern of a modulated transmission digital signal. As is evident from FIG. 7(B), the shape of the spread modulated signal pattern differs when the transmitted bit is "1" and when the transmitted bit is "0". As described above, a spread modulated digital signal is generated by the transceivers 111, 121 (see FIG. 1).

The receivers 112, 122 perform despreading of the spread modulated digital signal using the spread code. The despreading calculation is also known as an autocorrelation calculation. A spread code having the same value is used in both spread modulation and despreading. In FIG. 7, (C) is a schematic diagram showing the waveform of a despreaded transmission digital signal, and (D) is a schematic diagram showing the waveform shown in (C) as an eye pattern. As is evident from these diagrams, when the bit value of the digital signal is "1", a positive peak emerges, and when the bit value of the digital signal is "0", a negative peak emerges. Hence, by comparing the peak value obtained through despreading to a positive threshold and a negative threshold, the bit value thereof can be recognized.

In FIG. 7, (E) is a schematic diagram showing a signal waveform when despreading is performed using a different spread code to the spread code used in spread modulation. (F) is a schematic diagram showing the waveform shown in (E) as an eye pattern. Processing for performing a demultiplexing calculation using a different spread code to the spread code used in spread modulation is known as cross-correlation. As is evident from FIG. 7 (E) and (F), when a different spread code is used in spread modulation and despreading, no peak emerges irrespective of the bit value. Hence, when a despreading calculation is performed on a signal waveform produced by multiplexing a plurality of modulated signals having different spread codes using a specific spread code, only the peak corresponding to the spread code emerges.

Next, an overall operation of the synchronous CDM-PON 100 according to this embodiment will be described.

The synchronous CDM-PON 100 of this embodiment performs a normal communication operation that is an operation to transmit and receive communication frames between the OLT 110 and the ONUs 120-1 to 120-n, and a ranging operation that is an operation for synchronizing the ONUs 120-1 to 120-n.

First, the normal communication operation will be described in terms of downlink direction communication and uplink direction communication.

Downlink direction communication is an operation for transmitting a communication frame from the OLT 110 to the ONUs 120-1 to 120-n.

The data signal train 620 (see FIGS. 2, 6) is input into each of the transmission circuits 210-1 to 210-n provided in the transceiver 111 of the OLT 110. The synchronization signal adder 211 adds the synchronization signal 610 to the input data signal train 620. As a result, the communication frame 600 shown in FIG. 6 is obtained.

Next, the calculator 212 performs spread modulation using the communication frame 600 and the spread codes Sd1 to Sdn. More specifically, the calculator 212 multiplies the spread code by the communication frame 600. The spread modulated communication frame is then transmitted to the adder 220 from each transmission circuit 210-1 to 210-n. Each transmission circuit 210-1 to 210-n outputs the communication frame at the same timing. Hence, the communication frames are received by the adder 220 at the same timing.

The adder 220 superposes the received communication frames. Thus the communication frames 600 output respectively from the transmission circuits 210-1 to 210-n are synchronous code division multiplexed. The multiplexed communication frame reaches the optical coupler 130 via the optical communication path 140. The optical coupler 130 transmits the received multiplexed communication frame to the ONUs 120-1 to 120-n. The receiver 122 of each ONU 120-1 to 120-n receives the same multiplexed communication frame (see FIG. 5).

The matched filter 510 in the receiver 122 inputs the multiplexed communication frame. As described above, the matched filter 510 multiplies a corresponding spread code (one of the spread codes Sd1 to Sdn) by the input multiplexed communication frame. For example, the matched filter 510 in the ONU 120-1 uses the same spread code Sd1 as the transmission circuit 210-1. As a result, a signal on which an autocorrelation calculation has been implemented is output from the matched filter 510. The output signal of the matched filter 510 is input into the clock regenerator 520 and the gate 530.

The clock regenerator 520 regenerates a clock from the output signal of the matched filter 510 using a PLL circuit or the like, not shown in the drawing, for example. The gate 530 outputs the signal input from the matched filter 510 in accordance with a timing control signal input from the variable phase shifter 540. The timing control signal is generated on the basis of the sampling clock. The output signal of the gate 530 matches the signal before spread modulated by the transceiver 111 of the OLT 110. Thus the communication frame 600 is decoded.

The communication frame 600 output from the gate 530 is transmitted to a personal computer or the like and the synchronization signal detector 550. The synchronization signal detector 550 extracts the synchronization signal 610 from the input communication frame 600, and transmits the extracted synchronization signal 610 to the controller 123 (see FIG. 1).

The controller 123 extracts the control signal 612 (see FIG. 6) from the input synchronization signal 610. The OLT 110 may transmit phase control information as the control signal 612 to the ONU 120. As will be described below, the controller 123 controls the phase shift amount of the variable phase shifter 403 provided in the transceiver 121 using the received phase control information (see FIGS. 1, 4).

Next, normal uplink direction communication will be described.

Uplink direction communication is an operation for transmitting a communication frame from the ONUs 120-1 to 120-n to the OLT 110.

The transmission data signal 620 is input into the transceiver 121 provided in the ONUs 120-1 to 120-n (see FIGS. 4, 6). The synchronization signal adder 401 adds the synchronization signal 610 to the input transmission data signal 620. Thus the communication frame 600 shown in FIG. 6 is obtained.

Next, the calculator 402 performs spread modulation using the communication frame 600 and one of the spread codes Su1 to Sun. More specifically, the calculator 402 multiplies the corresponding spread code by the communication frame 600.

The spread modulated communication frame is input into the variable phase shifter 403. The variable phase shifter 403 controls the output timing of the spread modulated communication frame in accordance with the control of the controller 123. The controller 123 controls the variable phase shifter 403 in accordance with the phase control information received from the OLT 110. To realize synchronous code division multiplexing during uplink communication, the phase of each communication frame output from the respective ONUs 120-1 to 120-n must match when the communication frames reach the optical coupler 130. The variable phase shifter 403 adjusts the phase of each communication frame such that this phase matching is achieved.

The optical coupler 130 superposes the communication frames input from the ONUs 120-1 to 120-n and outputs the superposed communication frame. Thus the communication frames are multiplexed. Hence, the optical signal output from the optical coupler 130 is a synchronous code division multiplexed communication frame.

The optical signal output from the optical coupler 130 propagates along the optical communication path 140 to reach the OLT 110. The optical signal is transmitted to each of the reception circuits 310-1 to 310-n provided in the receiver 112 of the OLT 110.

The matched filter 311 of the receivers 310-1 to 310-n multiples a corresponding spread code (one of the spread codes Su1 to Sun) to the multiplexed communication frame. For example, the matched filter 311 in the receiver 310-1 uses the same spread code Su1 as the transceiver 121 in the ONU 120-1. As a result, it is possible to extract only a communication frame addressed to the ONU 120-1. The output signal of the matched filter 311 is input into the clock regenerator 312 and the gate 313.

The clock regenerator 312 regenerates a clock from the output signal of the matched filter 311 using a PLL circuit or the like, not shown in the drawing, for example. The gate 313 outputs the signal input from the matched filter 311 in accordance with a timing control signal input from the variable phase shifter 314. The timing control signal is generated on the basis of the sampling clock. The output signal of the gate 313 matches the signal before spread modulated in the ONUs 120-1 to 120-n. Thus the communication frame 600 is decoded.

The communication frame 600 output from the gate 313 is transmitted to a circuit not described (for example, a circuit which make a IP packet containing the data signal 620 and output the IP packet to external network) to and the synchronization signal detector 315. The synchronization signal detector 315 extracts the synchronization signal 610 from the input communication frame 600, and transmits the extracted synchronization signal 610 to the controller 113 (see FIG. 1)

The controller 113 extracts the control signal 612 (see FIG. 6) from the input synchronization signal 610. The ONUs 120-1 to 120-n may transmit a response signal to the phase control information, or in other words a signal indicating that the phase control information has been received normally, as the control signal 612.

Next, ranging will be described.

Figure 8:
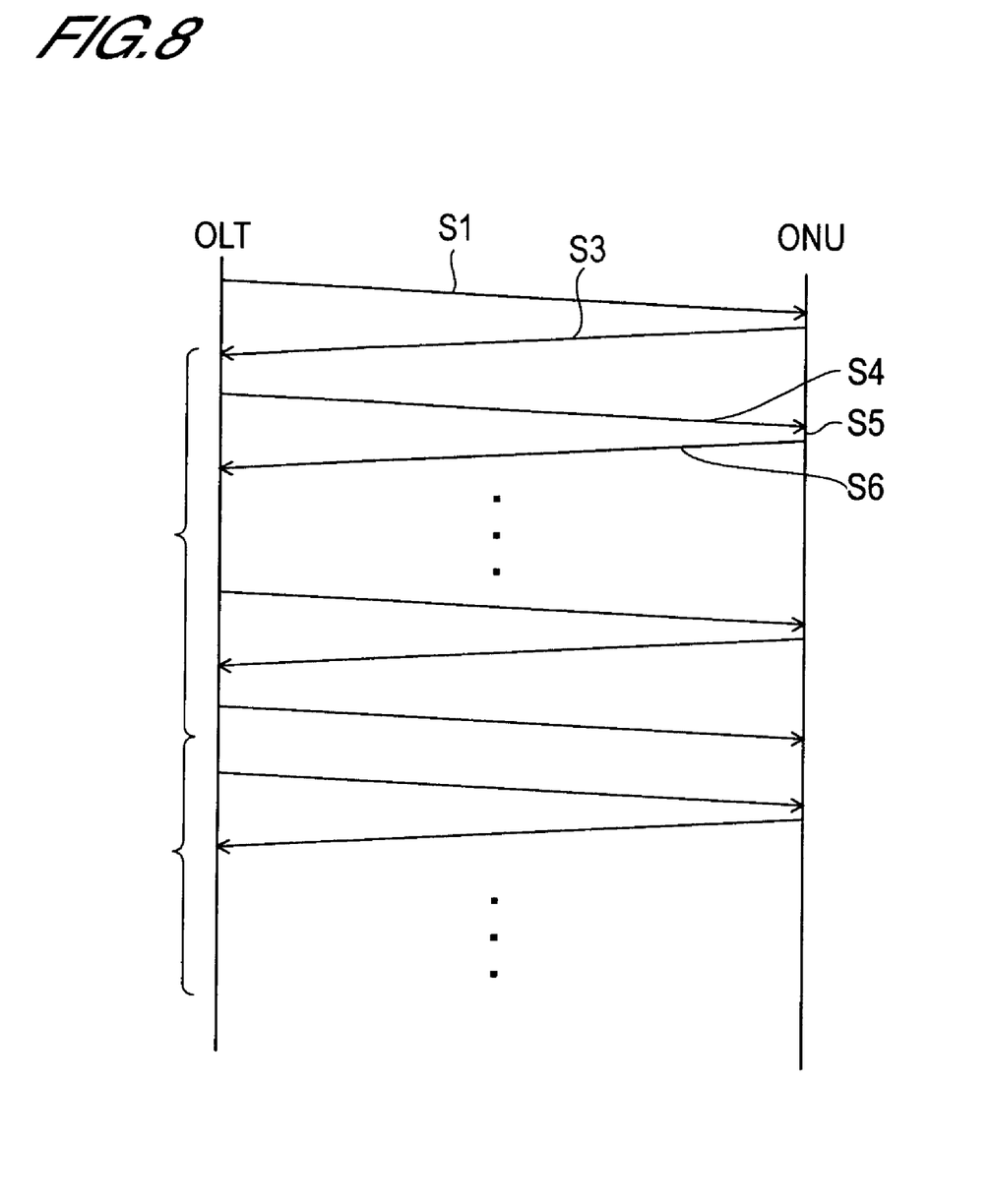
FIGS. 8 and 9 are schematic diagrams illustrating an operation of the communication network according to the first embodiment.
Figure 9:
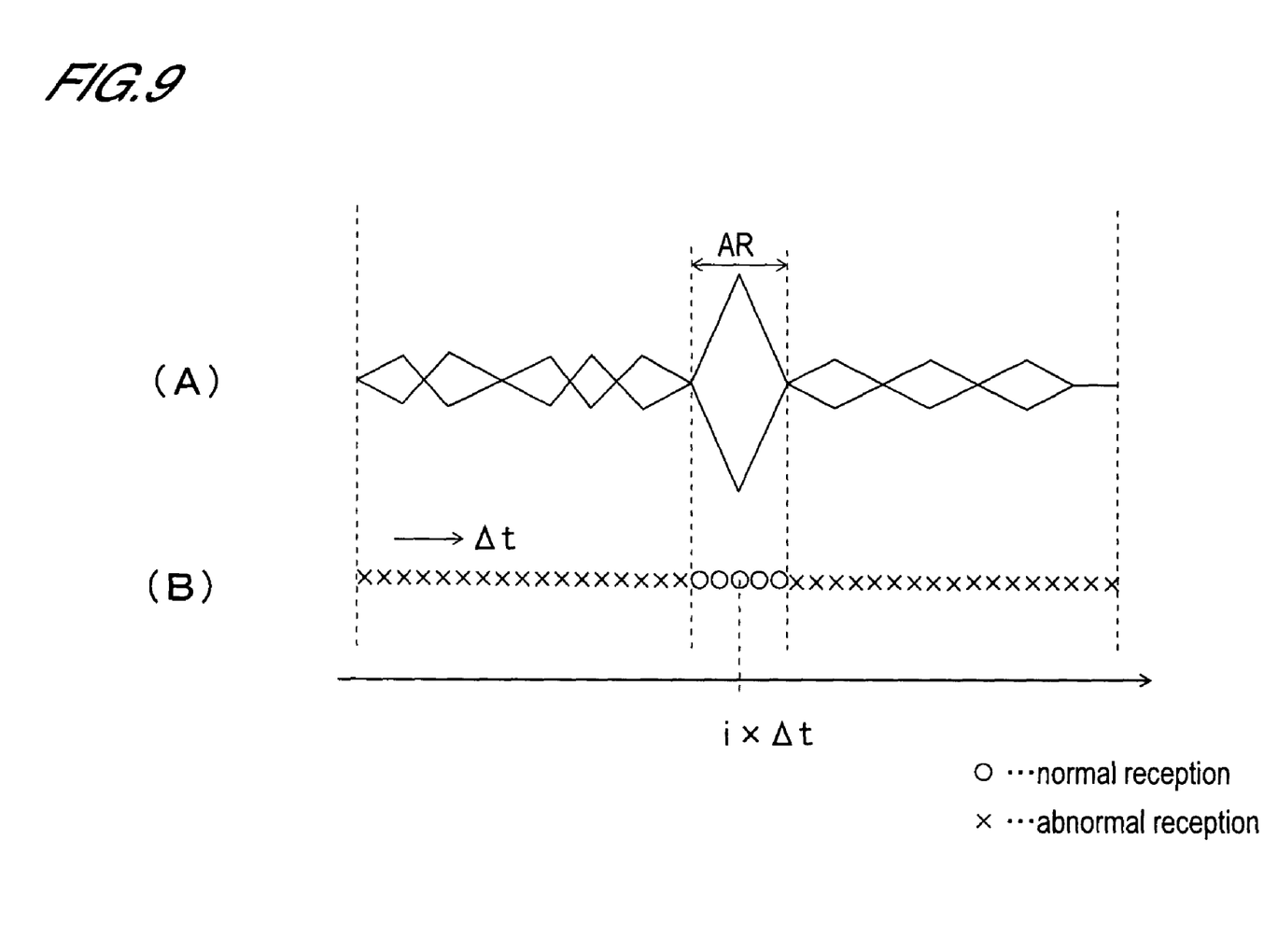

Ranging is an operation performed by the ONUs 120-1 to 120-n in accordance with the control of the OLT 110 to adjust the timing at which the communication frames 600 are transmitted. As described above, to realize synchronous code division multiplexing during uplink communication, the phase of each communication frame output from the respective ONUs 120-1 to 120-n must match when the communication frames reach the optical coupler 130. The variable phase shifter 403 adjusts the phase of each communication frame such that this phase matching is achieved. Ranging is executed when the synchronous CDM-PON 100 begins an operation. Ranging is also executed periodically or as needed while the synchronous CDM-PON 100 is operative. FIGS. 8 and 9 are schematic diagrams illustrating an operation of the synchronous CDM-PON 100.

Ranging is performed by repeating measurement communication.

First, the OLT 110 generates a command for halting communication of all of the ONUs 120-1 to 120-n. The communication halting command is transmitted to the ONUs 120-1 to 120-n as the aforementioned control signal 612 (see FIG. 6). Upon reception of the communication halting command, the ONUs 120-1 to 120-n shift to a standby state. The communication halting command doubles as notification of the start of ranging. Note, however, that a ranging start notification may be transmitted to the ONUs 120-1 to 120-n from the OLT 110 following transmission of the communication halting command.

Ranging of the ONU 120-1, or in other words ranging of a channel 1, is performed in the following manner.

The OLT 110 fixes the phase shift amount of the variable phase shifter 314 provided in the reception circuit 310-1 of the receiver 112 at an initial value. The phase shift amount of the variable phase shifter 314 is not changed until ranging is complete.

Next, the OLT 110 transmits a communication frame 600 addressed to the ONU 120-1 (see S1 in FIG. 8). A transmission permission signal is stored in the communication frame 600 as the control signal 612. In addition, phase control information $\Delta t1$ is stored in the communication frame 600 as the control signal 612. The phase control information is information indicating the phase shift amount to be set in the variable phase shifter 403 of the ONU. Two or more communication frames 600 storing the same transmission permission signal and phase control information may be transmitted consecutively. By transmitting a plurality of communication frames 600 having the same phase to the ONU 120-1, the reliability of the measurement to be described below (see S6 of FIG. 8) improves. Communication frames 600 addressed to the other ONUs 120-2 to 120-n are not transmitted.

The ONU 120-1 demultiplexes the received communication frame 600. The controller 123 of the ONU 120-1 reads the phase control information $\Delta t1$ from the control signal 612 of the demultiplexed communication frame 600. The controller 123 then adjusts the phase shift amount of the variable phase shifter 403 in accordance with the phase control information $\Delta t1$. Next, the ONU 120-1 transmits a communication frame 600 to the OLT 110 (see S2 of FIG. 8). A signal indicating a response is stored in the communication frame 600 as the control signal 612. The ONU 120-1 transmits the same number of response communication frames 600 as the communication frames 600 storing the transmission permission signal and phase control information to the OLT 110, for example.

The OLT 110 demultiplexes the received communication frame 600. Next, the controller 113 determines whether or not the communication frame 600 has been received normally (see S3 in FIG. 8). The determination result is held in the controller 113 together with the corresponding phase control information $\Delta t1$.

Next, the OLT 110 transmits another communication frame 600 addressed to the ONU 120-1 (see S4 in FIG. 8). A transmission permission signal and phase control information $\Delta t2$ are stored in the communication frame 600 as the control signal 612. In this embodiment, the value of $\Delta t2$ is twice the value of $\Delta t1$. Two or more of the communication frames 600 storing the phase control information $\Delta t2$ may be transmitted consecutively. No communication frames 600 are transmitted to the other ONUs 120-2 to 120-n.

The ONU 120-1 demultiplexes the received communication frame 600. The controller 123 of the ONU 120-1 reads the phase control information $\Delta t2$ from the control signal 612 of the demultiplexed communication frame 600. The controller 123 then adjusts the phase shift amount of the variable phase shifter 403 in accordance with the phase control information $\Delta t2$. Next, the ONU 120-1 transmits a communication frame 600 to the OLT 110 (see S5 of FIG. 8). A signal indicating a response is stored in this communication frame 600. The ONU 120-1 transmits the same number of response communication frames 600 as the communication frames 600 storing the transmission permission signal and phase control information to the OLT 110, for example.

The OLT 110 demultiplexes the received communication frame 600. Next, the controller 113 determines whether or not the communication frame 600 has been received normally (see S6 in FIG. 8). The determination result is held in the controller 113 together with the corresponding phase control information $\Delta t2$.

From the third time onward, measurement communication is performed similarly to the first and second times while gradually varying the phase control information. In this embodiment, the number of times measurement communication is executed is assumed to be "M".

Next, the OLT 110 calculates an optimum phase shift amount $i \times \Delta t$ using the determination results and the phase control information, or in other words the phase shift amount, relating to the ONU 120-1.

In FIG. 9, (A) shows the relationship between the output peak value of the matched filter 510 provided in the receiver 122 of the ONU 120-1 and the phase shift amount. (B) in FIG. 9 shows the relationship between the determination result produced by the controller 113 of the OLT 110 and the phase shift amount.

As described above using FIG. 7, the communication frame 600 is regenerated by comparing the output peak value of the matched filter 510 to a threshold. The output peak value of the matched filter 510 increases as the phase deviation of the communication frame 600 decreases (i.e. as the difference between the actual phase and the optimum phase decreases). Accordingly, the phase deviation amount of the communication frame 600 must be within a predetermined range so that the communication frame 600 can be received correctly.

The controller 113 determines a phase shift amount range AR within which the communication frame 600 can be received correctly using the results of the measurement communication described above (see FIG. 9(A)). The controller 113 then sets a central value of the range AR as the optimum phase shift amount i×Δt.

The OLT 110 transmits the corresponding optimum phase shift amount i×Δt to the ONU 120-1. The optimum phase shift amount i×Δt is stored in the corresponding communication frame 600 as the control signal 612. In addition to the optimum phase shift amount i×Δt, a ranging completion notification is stored in the control signal 612.

The ONU 120-1 receives the communication frame 600 and fixes the setting of the variable phase shifter 403 to the optimum phase shift amount i×Δt. Thus, ranging in relation to the ONU 120-1 is complete.

Once ranging of the ONU 120-1 is complete, the OLT 110 executes similar measurement communication and calculation processing on the other ONUs 120-2 to 120-n. The optimum phase shift amount i×Δt is calculated individually for each of the ONUs 120-1 to 120-n. The plurality of optimum phase shift amounts i×Δt obtained in this manner take values corresponding respectively to the distance between the corresponding ONU and the optical coupler 130.

Typically, the phase range measured during ranging corresponds to the bit interval of the communication frame 600. Therefore, when the phase shift amount is shifted by Δt upon each measurement communication, or in other words when Δt=Δ2t−Δ1t=Δ3t−Δ2t=. . . , the following Equation (1) is established.

$M \times \Delta t$ = bit interval of communication frame 600

To determine the optimum phase shift amount i×Δt with a high degree of precision, the phase shift amount Δt is preferably reduced and the number of measurements M is preferably increased. On the other hand, to perform ranging in a short amount of time, the phase shift amount Δt is preferably increased and the number of measurements M is preferably reduced.

The synchronous CDM-PON 100 according to this embodiment is capable of synchronizing the ONUs 120-1 to 120-n, or in other words adjusting the transmission phase shift amount, through simple ranging processing alone. In other words, synchronization deviations during uplink communication based on differences in the optical distances of the optical communication paths 150-1 to 150-n can be eliminated through simple ranging processing alone.

Second Embodiment

In the first embodiment described above, ranging is performed when an operation of the synchronous CDM-PON 100 begins or when normal communication is halted during an operation. In contrast, the second embodiment is a technique for performing ranging during an operation of the synchronous CDM-PON 100 using a communication frame 600 relating to normal communication.

Figure 10:
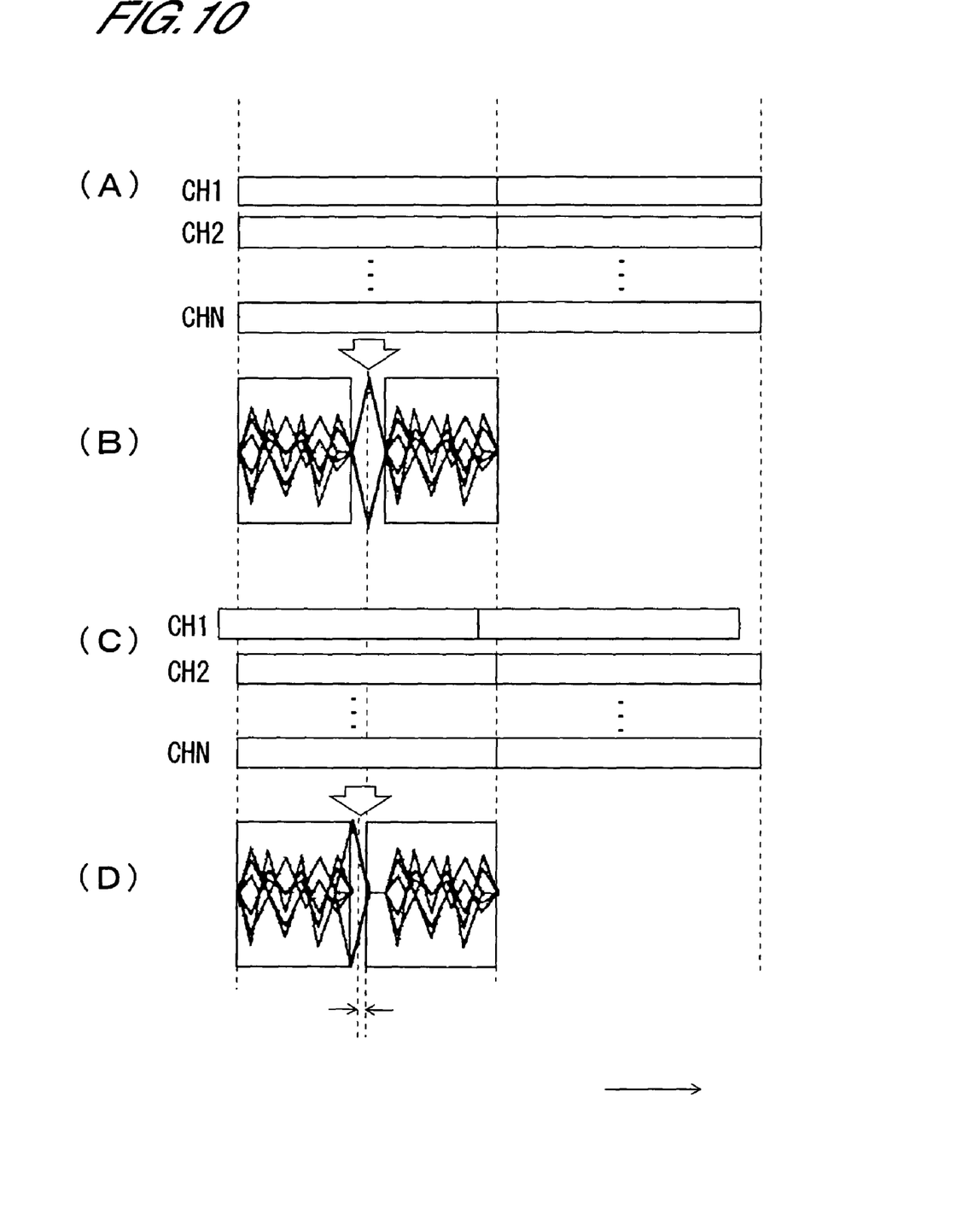
FIG. 10 is a schematic diagram illustrating an operation of a communication network according to a second embodiment.

Using the ranging according to the first embodiment or another technique, the transmission timing of the ONUs 120-1 to 120-n is adjusted at the start of an operation of the synchronous CDM-PON (see FIGS. 10(A) and 10(B)). However, the optical distance of the optical communication paths 150-1 to 150-n varies in accordance with environmental changes in temperature and so on, and as a result, the reception timing of the optical coupler 130 gradually shifts (see FIGS. 10C and 10D). The amount of this shift differs in each of the optical communication paths 150-1 to 150-n. Therefore, to keep the reception timing of the optical coupler 130 synchronized, ranging is preferably performed as needed while the synchronous CDM-PON is operative. However, it is undesirable to perform ranging by periodically interrupting the operation of the synchronous CDM-PON. The synchronous CDM-PON according to this embodiment is capable of performing ranging without interrupting an operation.

The constitutions of the synchronous CDM-PON and the communication frame according to this embodiment are identical to those of the first embodiment (see FIGS. 1 to 6).

A multiplexed signal received by the OLT 110 is transmitted to the receiver 112 (see FIG. 1). Then, in the reception circuits 310-1 to 310-n in the receiver 112, the matched filter 311 performs an autocorrelation calculation of the multiplexed signal (see FIG. 3). As a result, the communication frame 600 is regenerated. The regenerated communication frame 600 includes the fixed signal 611, the control signal 612, and the data signal 620 (see FIG. 6).

The regenerated communication frame is input into the clock regenerator 312 and the gate 313. The clock regenerator 312 regenerates the sampling clock using the fixed signal 611 of the communication frame 600. While the clock regenerator 312 is inputting the fixed signal 611, or in other words while processing is underway for synchronizing the fixed signal 611 and the sampling clock, the variable phase shifter 314 performs a measurement relating to the ranging of this embodiment (to be described below). Once synchronism is established in the sampling clock, the variable phase shifter 314 controls the output timing of the gate 313 in accordance with the sampling clock. As a result, the control signal 612 and data signal 620 are output from the gate 313 in synchronization with the sampling clock.

The measurement of the variable phase shifter 314 will now be described.

When the clock regenerator 312 begins synchronism establishment processing, the variable phase shifter 314 sets the phase shift amount. When a multiplexed signal corresponding to the first communication frame following the previous ranging is input into the receiver 112, the phase shift amount is set to the initial value. The fixed signal 611 at this time is transmitted to the controller 113 via the gate 313. The controller 113 determines whether or not the fixed signal 611 has been received normally, and holds the determination result together with the phase shift amount (i.e. zero). When synchronism is established in the sampling clock by the clock regenerator 312, the variable phase shifter 314 begins control of the gate 313 based on the sampling clock.

When a multiplexed signal corresponding to the next communication frame is input into the receiver 112, the variable phase shifter 314 sets the phase shift amount to Δt1. The fixed signal 611 at this time is also transmitted to the controller 113 via the gate 313. The controller 113 determines whether or not the fixed signal 611 has been received normally, and holds the determination result together with the phase shift amount Δt1.

When synchronism is established in the sampling clock by the clock regenerator 312, the variable phase shifter 314 restarts control of the gate 313 based on the sampling clock.

From the third time onward, the measurement processing is performed similarly to the first and second times while gradually varying the phase control information. In this embodiment, the number of times measurement processing is executed is assumed to be "M".

Once the final measurement processing is complete, the controller 113 calculates the optimum phase shift amount i×Δt using the results of the measurement processing. The method for calculating the optimum phase shift amount i×Δt is identical to that of the first embodiment described above (see FIG. 9).

This measurement processing is executed by all of the reception circuits 310-1 to 310-n. Therefore, the OLT 110 can calculate the optimum phase shift amount i×Δt of all of the ONUs 120-1 to 120-n in parallel.

The controller 113 compares the optimum phase shift amount i×Δt with the previously calculated optimum phase shift amount i×Δt. When the two values do not match, the new optimum phase shift amount i×Δt is transmitted from the OLT 110 to the ONU 120-1. The optimum phase shift amount i×Δt is stored in the corresponding communication frame 600 as the control signal 612. When the new optimum phase shift amount i×Δt matches the previous optimum phase shift amount i×Δt, the OLT 110 does not transmit the new optimum phase shift amount i×Δt.

The ONUs 120-1 to 120-n receive the communication frame 600 and modify the setting of the variable phase shifter 314 to the new optimum phase shift amount i×Δt.

According to this embodiment, the set value of the variable phase shifter 314 can be caused to follow variation in the optical distance of the optical communication paths 150-1 to 150-n without interrupting normal communication. Therefore, according to this embodiment, the transmission timing of the ONUs 120-1 to 120-n can be synchronized precisely.

In the first and second embodiments described above, examples were provided in which the present invention is applied to a PON that is an optical communication network, but the present invention may be applied to an electric communication network.

In the first and second embodiments, examples were provided in which the variable phase shifters 314, 540 adjust the output timing of the communication frame from the gate 313 in accordance with the sampling clock alone. However, the timing of the variable phase shifters 314, 540 may be adjusted on the basis of both the sampling clock and the output of the synchronization signal detector 315.

In the first and second embodiments, examples were provided in which the variable phase shifters 314, 540 are provided between the clock regenerators 312, 520 and the gates 313, 530. In these examples, the communication frame phase is adjusted by controlling the output timing of the gates 313, 530. However, the variable phase shifters 314, 540 may be disposed on the output side of the gates 313, 530. In this case, phase adjustment is performed by shifting the output timing of the communication frames input from the gates 313, 530, similarly to the variable phase shifter 314. Further, the variable phase shifters 314, 540 for adjusting the timing control signal of the gates 313, 530 may be provided together with a variable phase shifter for adjusting the phase of the communication frames input from the gates 313, 530.

In the first and second embodiments, the correlation calculation is performed using the matched filters 311, 510. However, another calculation circuit such as a sliding correlator, for example, may be used.

In the second embodiment, a case was described in which channel ranging corresponding to all of the ONUs 120-1 to 120-n is performed in parallel, but ranging may be performed one channel at a time. To perform accurate synchronization, the ranging of each channel is preferably performed in a short cycle. When the number of ONUs, or in other words the number of channels, is small, the cycle in which ranging is performed on each channel can be made sufficiently short even when ranging is performed one channel at a time. When ranging is performed one channel at a time, a ranging-dedicated receiver may be provided in the OLT 110 and shared among the channels.

In the second embodiment, the ranging measurement range is set to the width of a single bit of the communication frame. However, the ranging of the second embodiment often involves only minute adjustments, and hence ranging may be performed in relation to a shorter range than a single bit width.

In the first and second embodiments, ranging was described using an example in which measurement is performed while increasing the phase shift amount from a minimum value. However, measurement may be performed while reducing the phase shift amount from a maximum value. Moreover, a phase shift amount algorithm may be determined using a bisection method or another search method.

In the first and second embodiments, when transmitting the optimum phase shift amount i×Δt from the OLT 110 to the ONU 120-1, the absolute value of the optimum phase shift amount i×Δt may be transmitted, or an amount of variation from the initial value may be transmitted, or an amount of variation from the previously set value may be transmitted.

The ranging according to the second embodiment may also be employed in a synchronous CDM-PON which does not use the ranging according to the first embodiment.

What is claimed is:

1. A communication network comprising:
a plurality of first communication devices, each of which comprises a first transceiver which transmits a spread modulated signal, a first receiver which receives phase control information, and a first controller which controls a phase at which the first transceiver transmits the spread modulated signal, using the phase control information;
a repeater which generates a code division multiplexed signal by superposing spread modulated signals transmitted respectively by the first communication devices; and
a second communication device comprising a second receiver which receives and demultiplexes the code division multiplexed signal, a second controller which determines an optimum phase of the spread modulated signal for each of the first communication devices using the demultiplexed signal, and a second transceiver which transmits the optimum phase to the first receiver as the phase control information,
wherein the second controller detects a minimum phase and a maximum phase at which the demultiplexed signal is received normally, and determines that a central value between the minimum phase and the maximum phase is the optimum phase.

2. The communication network according to claim 1, wherein the second controller comprises a ranging function including:
processing for transmitting phase control information having different phase shift amounts in succession to one of the first communication devices;

processing for detecting whether or not received signal waves corresponding to the phase control information have been received normally;

processing for determining the minimum phase shift amount and the maximum phase shift amount on the basis of the results of the detection;

processing for determining the optimum phase using the minimum phase shift amount and the maximum phase shift amount; and processing for causing the second transceiver to transmit the phase control information which indicates the optimum phase.

3. The communication network according to claim 2, wherein the ranging function is executed in all of the first communication devices when the transmission of data received from an information terminal has been halted.

4. The communication network according to claim 3, wherein the ranging function is executed at the beginning of a system operation.

5. The communication network according to claim 3, wherein the ranging function is executed by interrupting a system operation.

6. The communication network according to claim 2, wherein the ranging function is executed for each of the first communication devices in succession.

7. The communication network according to claim 2, wherein the ranging function is executed by varying a phase within a range corresponding to the width of a single bit of communication data.

8. The communication network according to claim 1, wherein communication between the first and second communication devices is optical communication.

9. The communication network according to claim 1, wherein communication between the first and second communication devices is electric communication.

10. A communication network comprising:

a plurality of first communication devices, each of which comprises a first transceiver which transmits a spread modulated signal, a first receiver which receives phase control information, and a first controller which controls a phase at which the first transceiver transmits the spread modulated signal, using the phase control information;

a repeater which generates a code division multiplexed signal by superposing spread modulated signals transmitted respectively by the first communication devices; and a second communication device comprising a second receiver which receives and demultiplexes the code division multiplexed signal, a second controller which determines an optimum phase of the spread modulated signal for each of the first communication devices using the demultiplexed signal, and a second transceiver which transmits the optimum phase to the first receiver as the phase control information, wherein the second controller comprises a ranging function including:

processing for performing phase shift on signal waves received respectively from the first communication devices;

processing for detecting whether or not each received signal wave has been received normally;

processing for determining a minimum phase shift amount and a maximum phase shift amount on the basis of the results of the detection;

processing for determining the optimum phase using the minimum phase shift amount and the maximum phase shift amount; and processing for causing the second transceiver to transmit the phase control information indicating the optimum phase.

11. The communication network according to claim 10, wherein the phase shift is performed every time one signal wave is received from the same first communication device.

12. The communication network according to claim 10, wherein the ranging function is executed during a system operation.

13. The communication network according to claim 10, wherein the ranging function is executed using a fixed signal constituted by a bit string having a predetermined pattern, which is added to a header part of the signal wave.

14. The communication network according to claim 10, wherein the ranging function is executed simultaneously for all of the first communication devices.

15. The communication network according to claim 10, wherein the ranging function is executed by varying a phase within a range that is shorter than the width of a single bit of communication data.

16. A communication network comprising:

a plurality of first communication devices, each of which comprises a first transceiver which transmits a spread modulated signal, a first receiver which receives phase control information, and a first controller which controls a phase at which the first transceiver transmits the spread modulated signal, using the phase control information;

a repeater which generates a code division multiplexed signal by superposing spread modulated signals transmitted respectively by the first communication devices; and a second communication device comprising a second receiver which receives and demultiplexes the code division multiplexed signal, a second controller which determines an optimum phase of the spread modulated signal for each of the first communication devices using the demultiplexed signal, and a second transceiver which transmits the optimum phase to the first receiver as the phase control information, wherein communication between the first and second communication devices is performed using a communication frame comprising a fixed signal constituted by a bit string having a predetermined pattern, a control signal for transmitting control information, and a data signal for transmitting data, and wherein the first transceiver comprises:

a synchronization signal adder which adds a synchronization signal including the fixed signal and the control signal to data received from an information terminal;

a calculator which performs the spread modulation of an output signal from the synchronization signal adder; and a variable phase shifter which adjusts a phase of a spread modulated signal output from the calculator.

17. The communication network according to claim 16, wherein the first receiver comprises:

a demultiplexer which demultiplexes a signal wave addressed to the first receiver from a code division multiplexed signal received from the repeater;

a clock regenerator which regenerates a sampling clock using a signal wave input from the demultiplexer;

a gate which latches the signal wave input from the divider; and a variable phase shifter which causes the gate to output the latched signal wave in accordance with a timing of the sampling clock.

18. The communication network according to claim 16, wherein the second transceiver comprises:

a plurality of transmission circuits, each comprising a synchronization signal adder which adds a synchronization signal including the fixed signal and the control signal to data received from an information terminal, an adder which performs a spread modulation of an output signal from the synchronization signal adder; and a calculator which performs code division multiplexing by adding the spread modulated signals output respectively from the transmission circuits.

19. The communication network according to claim 16, wherein the second receiver comprises a plurality of reception circuits, each comprising:

a divider which demultiplexes a signal wave addressed to the second receiver from a code division multiplexed signal received from the repeater;

a clock regenerator which regenerates a sampling clock using a signal wave input from the divider;

a gate which latches the signal wave input from the divider; and a variable phase shifter which causes the gate to output the latched signal wave in accordance with a timing of the sampling clock.

\* \* \* \* \*